(12) United States Patent
Baumer

(10) Patent No.: US 10,680,417 B2
(45) Date of Patent: Jun. 9, 2020

(54) SECURING SYSTEM FOR SECURING A ROOF STRUCTURE IN A NOTCH ON THE ROOF OF A SWITCH CABINET

(71) Applicant: RITTAL GMBH & CO. KG, Herborn (DE)

(72) Inventor: Carsten Baumer, Freudenberg (DE)

(73) Assignee: Rittal GmbH & Co. KG, Herborn (DE)

( * ) Notice: Subject to any disclaimer, the term of this patent is extended or adjusted under 35 U.S.C. 154(b) by 340 days.

(21) Appl. No.: 15/746,528

(22) PCT Filed: Jul. 18, 2016

(86) PCT No.: PCT/DE2016/100323
§ 371 (c)(1),
(2) Date: Jan. 22, 2018

(87) PCT Pub. No.: WO2017/012611
PCT Pub. Date: Jan. 26, 2017

(65) Prior Publication Data
US 2018/0219357 A1    Aug. 2, 2018

(30) Foreign Application Priority Data

Jul. 23, 2015 (DE) .......................... 10 2015 111 992

(51) Int. Cl.
| | |
|---|---|
| *H02B 1/01* | (2006.01) |
| *H02B 1/30* | (2006.01) |
| *F16B 2/06* | (2006.01) |
| *H02B 1/56* | (2006.01) |

(52) U.S. Cl.
CPC ............. *H02B 1/012* (2013.01); *F16B 2/065* (2013.01); *H02B 1/30* (2013.01); *H02B 1/565* (2013.01)

(58) Field of Classification Search
CPC ........... F16B 2/065; H02B 1/30; H02B 1/565; H02B 1/012; B60R 9/058
(Continued)

(56) References Cited

U.S. PATENT DOCUMENTS 3,731,897 A * 5/1973 Price ...................... F16M 13/02
248/230.1
4,489,869 A * 12/1984 Wienhold ............... B60R 9/048
224/321

(Continued)

FOREIGN PATENT DOCUMENTS

| DE | 8205341 U1 | 5/1982 |
|---|---|---|
| DE | 4110323 C1 | 7/1992 |

(Continued)

OTHER PUBLICATIONS

European Patent Office, International Search Report with Written Opinion issued in PCT/DE2016/100323, dated Oct. 27, 2016, 12 pages, European Patent Office, Rijswijk, Netherlands.

*Primary Examiner* — Terrell L McKinnon
*Assistant Examiner* — Michael McDuffie
(74) *Attorney, Agent, or Firm* — Marshall & Melhorn, LLC

(57) ABSTRACT

The invention relates to a securing system for securing a roof structure, in particular a cooling device, in a notch on the roof of a switch cabinet, wherein the securing system comprises a pretensioning device connected to the roof structure for a securing clamp, wherein the securing clamp comprises a fixed end and an end that moves with respect to the fixed end, on which the pretensioning device engages, so that a radius of curvature of the securing clamp can be set via the pretensioning device, wherein in a first position of the pretensioning device, the securing clamp engages underneath an edge of the notch and thereby fixes the roof (Continued)

structure on the switch cabinet, and in a second position of the pretensioning device, the securing clamp releases the notch.

11 Claims, 4 Drawing Sheets

(58) Field of Classification Search
USPC .... 248/237, 220.21, 221.11, 222.11, 222.12, 248/223.41, 225.11, 225.21, 316.1, 316.4, 248/316.6
See application file for complete search history.

(56) References Cited

U.S. PATENT DOCUMENTS

| | | | | |
|---|---|---|---|---|
| 8,651,436 | B2* | 2/2014 | Inoue | F16L 3/2332 24/132 R |
| 9,893,677 | B1* | 2/2018 | Liu | H02S 20/23 |
| 2005/0121845 | A1* | 6/2005 | Bries | B25B 5/006 269/41 |
| 2009/0266958 | A1* | 10/2009 | Meersman | F16B 2/065 248/231.51 |
| 2015/0129517 | A1* | 5/2015 | Wildes | H02S 20/23 211/41.1 |
| 2018/0080205 | A1* | 3/2018 | Smith | E03C 1/335 |
| 2018/0342974 | A1* | 11/2018 | Jasmin | F16B 5/0225 |
| 2020/0052470 | A1* | 2/2020 | Matsuo | F16B 2/065 |

FOREIGN PATENT DOCUMENTS

| | | |
|---|---|---|
| DE | 102011118560 A1 | 5/2013 |
| EP | 0594542 A1 | 4/1994 |
| EP | 2592365 A2 | 5/2013 |
| GB | 2254735 A | 10/1992 |

* cited by examiner

SECURING SYSTEM FOR SECURING A ROOF STRUCTURE IN A NOTCH ON THE ROOF OF A SWITCH CABINET

BACKGROUND OF THE INVENTION

The present invention refers to a securing system for securing a roof structure, in particular of a cooling device, in a notch in the roof of a switch cabinet.

SUMMARY OF THE INVENTION

In currently known securing systems it always happens that these securing systems can only be actuated either from the inner side of the switch cabinet or from the outer side of the switch cabinet. In particular when the inner space of the switch cabinet is still unfinished, it is often desirable to allow a securing of the roof structure from the inner side of the switch cabinet, in order, for example, to avoid, that for actuating the securing means, the switch cabinet has to be climbed up by means of a ladder or similar. If the switch cabinet is completed and if, for example, the already mounted roof structure has to be modified, it happens that the securing means for the roof structure are difficult to access from the inner side of the switch cabinet. In this case it would be advantageous if the roof structure were secured by securing means, which are accessible from the outer side of the switch cabinet.

Therefore, the object of the invention is to propose a securing system of the above-said type, which is easily operated and which allows a secure fixing of a roof structure onto the switch cabinet.

This object is achieved, according to the invention, by a securing system having the characteristics of claim 1. The dependent claims respectively refer to advantageous embodiments of the invention.

Consequently, the securing system has a pretensioning device connected to the roof structure for a securing clamp, wherein the securing clamp comprises a fixed end and an end that moves with respect to the fixed end, on which the pretensioning device engages. It is thus achieved that a radius of curvature of the securing clamp can be set via the pretensioning device, wherein in a first position of the pretensioning device, the securing clamp engages underneath an edge of the notch and thereby fixes the roof structure on the switch cabinet, and in a second position of the pretensioning device, the securing clamp releases the notch.

The pretensioning device may extend from an outer side of the roof structure through the roof structure up to an inner side of the roof structure and is provided on the outer side with a first drive as well as on the inner side with a second drive. The first and second drive may be driven hoods, such as a torx-25 drive.

In this way, a securing system is obtained, in which for mounting the roof structure in a notch in the roof of a switch cabinet, the roof mounting may be initially performed from the inner side of the switch cabinet, whereby insofar the operation by the user is facilitated, since the user does not need a ladder or similar. If the switch cabinet is filled with components in the course of time, or if the mounting space within the switch cabinet is filled up in such a way that mounting or dismounting of the roof structure from the inner side is no more possible, then the securing element, which has been previously actuated from the inner side of the switch cabinet, may also be actuated from the outer side of the switch cabinet, in particular from the roof side of the switch cabinet, wherein the entire functionality of the securing system is maintained.

The pretensioning device may also be provided with a first bolt with the first drive for a tool and a second bolt with the second drive for a tool, wherein the bolts are non-rotatably connected to each other. To this end, the bolts may be provided with complementary threads, through which the bolts engage into each other, wherein the bolts may be provided for mutual non-rotatable engagement. They may, for example, be fixed by gluing.

It may also be conceived that one of the bolts has a bolt shaft having an outer thread, with which the bolt extends through a threaded sleeve forming a passage between an inner side of the roof structure and an outer side of the roof structure and having a complementary inner thread, wherein the threaded sleeve is non-rotatably connected about its longitudinal axis to the roof structure. The threaded sleeve may thus form a threaded bearing for the bolt shaft, along which the latter may be positioned, by rotation, in different positions, in order to variably adjust the securing clamp, in particular its movable end.

The second bolt may be provided as a sleeve nut having a screw head provided with the second drive.

The securing clamp may also have a slot at the movable end, which slot extends along the securing clamp in the direction of the fixed end, wherein one of the bolts extends, with its bolt shaft, through the slot, and supports the securing clamp with an edge portion of the slot against a bolt head of the second bolt, so that the bolt shaft is guided along the slot, when the pretensioning device is moved between the first and second position.

The securing clamp may be vertically fixed with its fixed end to an inner side of the roof structure, above the notch and at a distance from an edge of the notch on the inner side of the roof structure, subsequently extending through the notch into the switch cabinet inner space and approach the edge of the notch. In order to ensure the swinging in and out of the securing clamp, the pretensioning device may be biased by a spring element in the second position.

The securing clamp may be made of an elastic spring material, preferably spring steel, wherein the securing clamp may also be provided with a bias in the direction of the second position.

The securing system according to the invention allows a subsequent manipulation of the roof structure securing system, in particular a re-tensioning of the securing system, to occur at any time after the securing of the roof structure onto the roof of the switch cabinet. To this end, it may be foreseen that the drive on the inner side of the switch cabinet and the drive on the outer side of the switch cabinet are identical, so that correspondingly identical tools may be used for actuating the drive.

It is also possible that the roof structure has a surrounding flange, through which the roof structure is applied on an edge of the notch of the switch cabinet roof, wherein, in an overlapping region between the surrounding flange and the edge, a sealing element is disposed, the compression of which may be variably set by means of the pretensioning device.

BRIEF DESCRIPTION OF THE DRAWINGS

Further details are explained by means of the following figures. In particular.

DETAILED DESCRIPTION OF THE INVENTION

Figure 1:
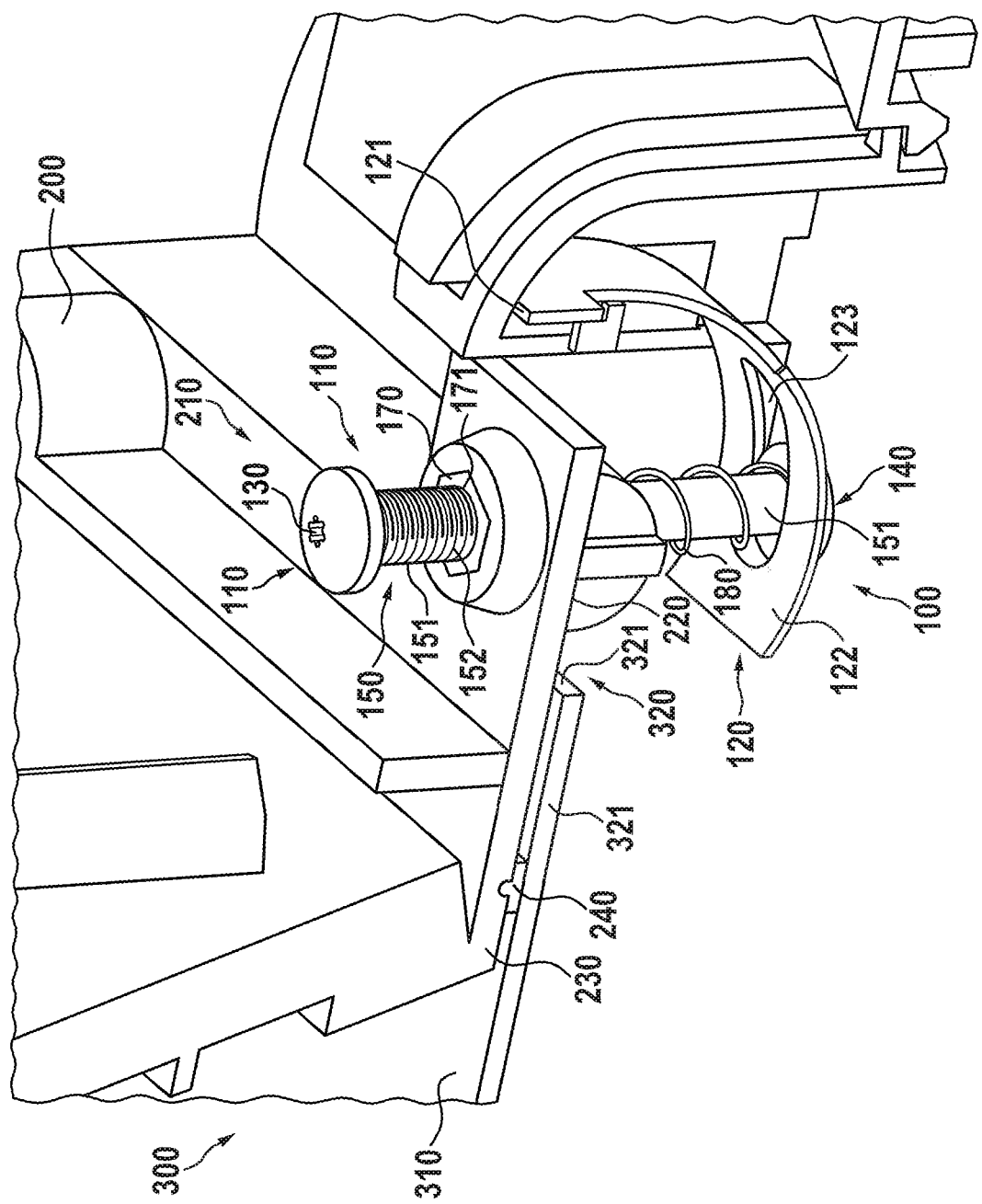
FIG. 1 shows a cut-out view from above of the upper side of a switch cabinet assembly having an embodiment of the securing system according to the invention.

In the embodiment shown in FIG. 1, of a securing system 100 for securing a roof structure 200 in or on a notch 320 in the roof 310 of a switch cabinet 300, the essential components of the securing system 100 form the pretensioning device 110, which is connected to the roof structure 200 as well as the securing clamp 120, which may selectively be moved back and forth through the pretensioning device 110 between a first position of the pretensioning device, in which the securing clamp 120 engages underneath an edge 321 of notch 320 and thus fixes the roof structure 200 on the switch cabinet 300, and a second position of the pretensioning device, in which the securing clamp releases the notch.

The securing clamp 120 has a fixed end 121, through which the securing clamp 120 is fixed to the inner side 220 of roof structure 200. The securing clamp 120 also has a movable end 122 opposite the fixed end 120, which is engaged by the pretensioning device, so that by bending the securing clamp 120 the position of the movable end 122 relative to the edge 321 of notch 320 may thus be set by actuating the pretensioning device 110.

The pretensioning device 110 has a bolt 150 having a bolt shaft 151, which in turn has an outer thread 152, through which the bolt 150 is screwed in a threaded sleeve 170 having a complementary inner thread 171. The threaded sleeve 170 has a polygonal outer contour, through which it is housed within a recess of the roof structure at least by form-fit. The threaded sleeve 170 just forms a passage through the roof structure 200 and thus connects the outer side 210 of the roof structure 200 to the inner side 220 of the roof structure 200.

A helical spring 180 is provided for pivoting, in a defined way, the securing clamp 120 when actuating the drive 130, whereby the bolt 150 is moved with respect to sleeve 170.

Figure 2:
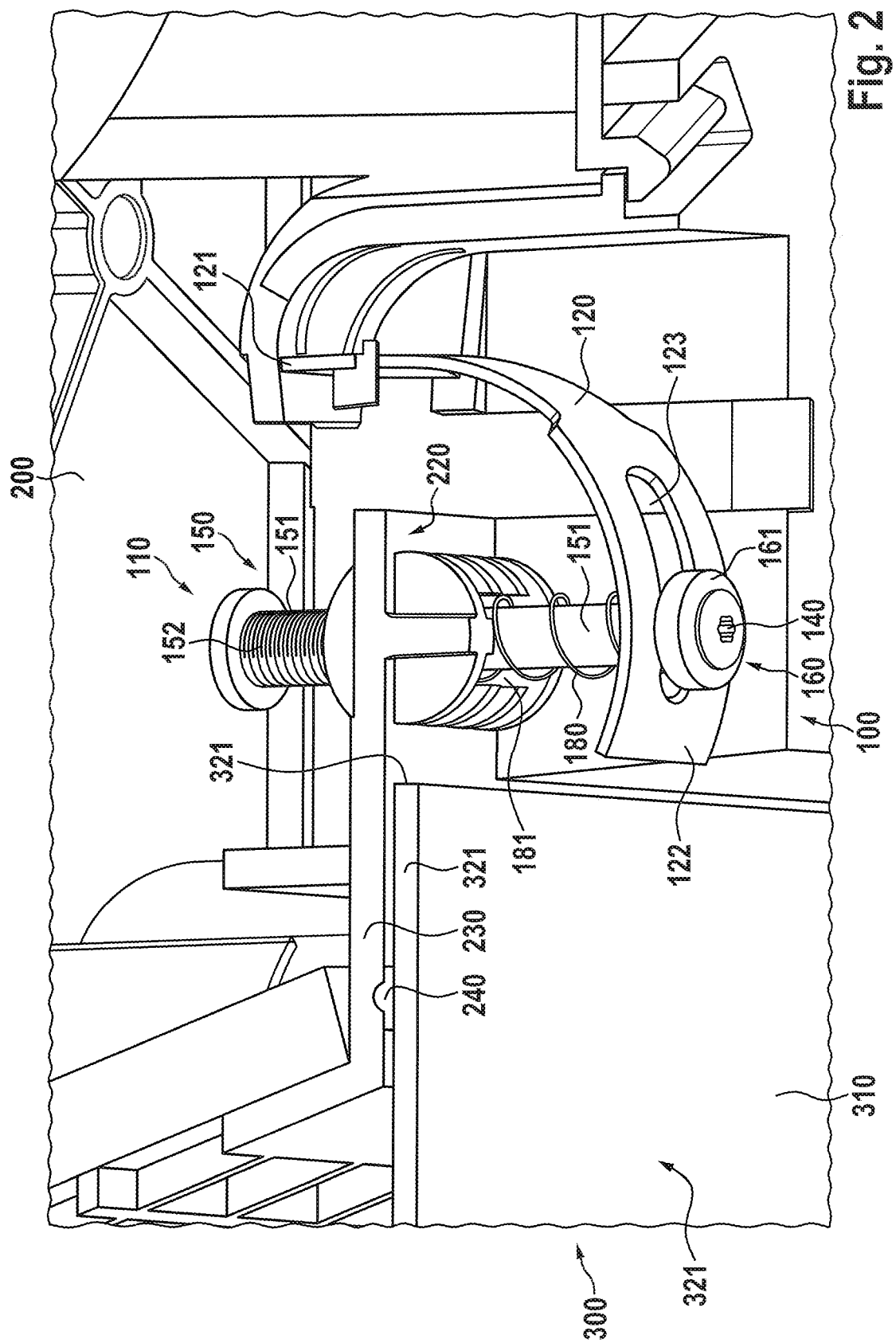
FIG. 2 shows the embodiment of FIG. 1, wherein the securing system is observed from the inner side of the switch cabinet assembly.
Figure 3:
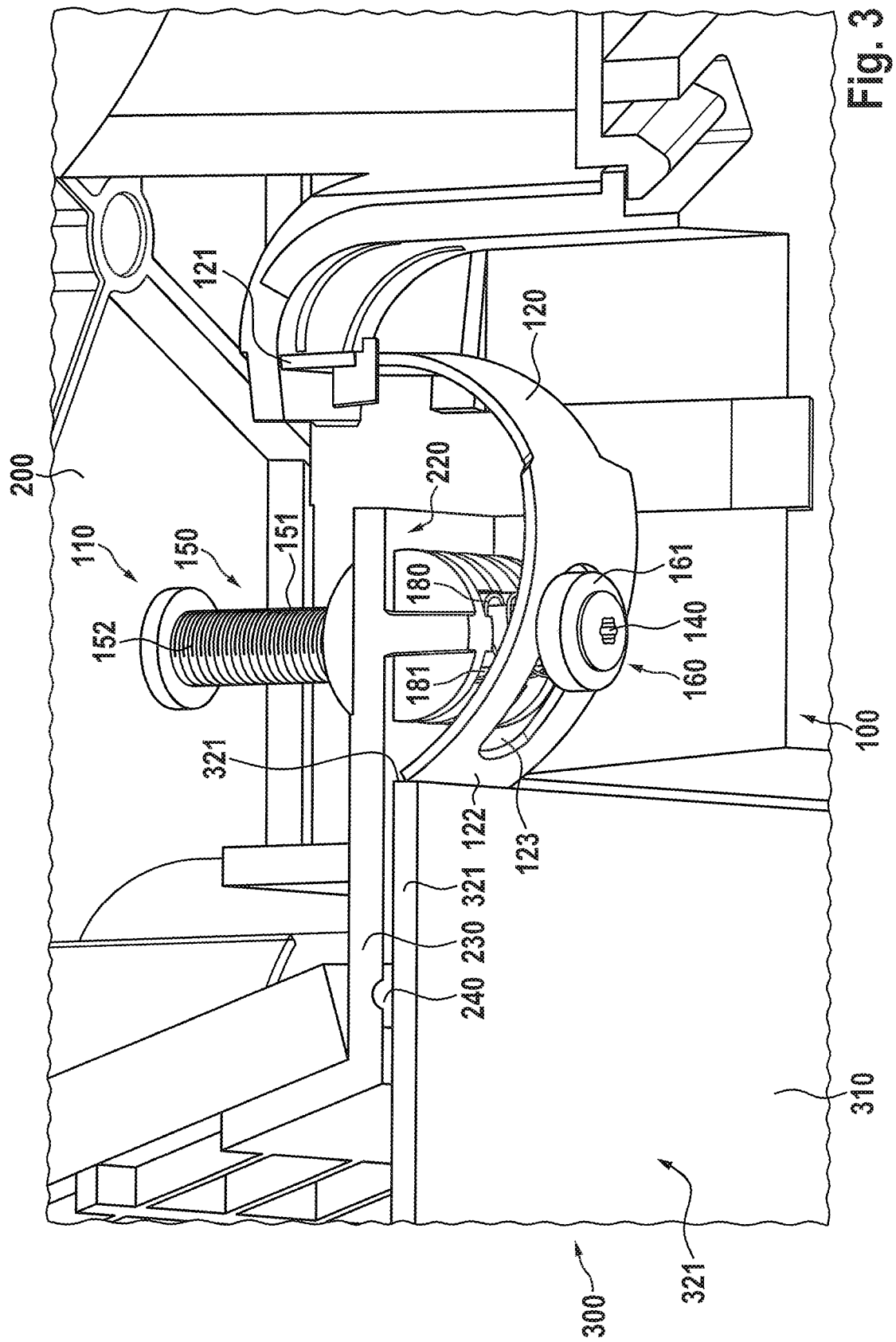
FIG. 3 shows the view of FIG. 2, wherein the securing clamp is shown in the first position.

The securing clamp 120 has, at its movable end 122, a slot 123, in which the shaft 151 of bolt 150 is guided, when the pretensioning device 110 is actuated, in order to move the securing clamp from the release position shown in FIGS. 1 and 2 into the locked position shown in FIG. 3.

A surrounding flange 230 of the roof structure 200 overlaps an edge region 321 of the roof 310 of the switch cabinet, wherein in the overlapping region a sealing element 240 is provided. It may be seen that the inventive securing system also has the advantage of allowing a variable setting of compression of sealing element 240 and thus of the sealing effect through this pretensioning device 110.

The second bolt 160 is a sleeve nut, which may be screwed on an outer thread of the upper bolt 150. The sleeve nut also fixes the bolt head 161 on the lower end of the bolt 150, in order to connect the securing clamp 120 through the slot 123 to the pretensioning device. The bolt head 161 just has a bearing surface, onto which the securing clamp 120 lies with the edge region of slot 123.

In the release position shown in FIGS. 1 and 2, the movable end 122 of securing clamp 120 does not engage underneath the edge region 321 of roof 310, while the free end 122 is completely positioned within the notch 320 of roof 310. FIG. 3, on the contrary, shows the situation in which the movable end 122 engages underneath the edge 321 of notch 320 and bears thereon. When comparing FIGS. 2 and 3, it may also be noticed that for moving the movable end 122 between the release position and the locking position, the pretensioning device 110, and thus the bolt shaft 151, has been moved upwards in this representation, and thus the spring element 180 has been compressed. The spring element 180 is a helical spring, which is positioned coaxially with respect to bolt shaft 151, and which is held in a spring recess 181 on the inner side 220 of roof structure 200.

Figure 4:
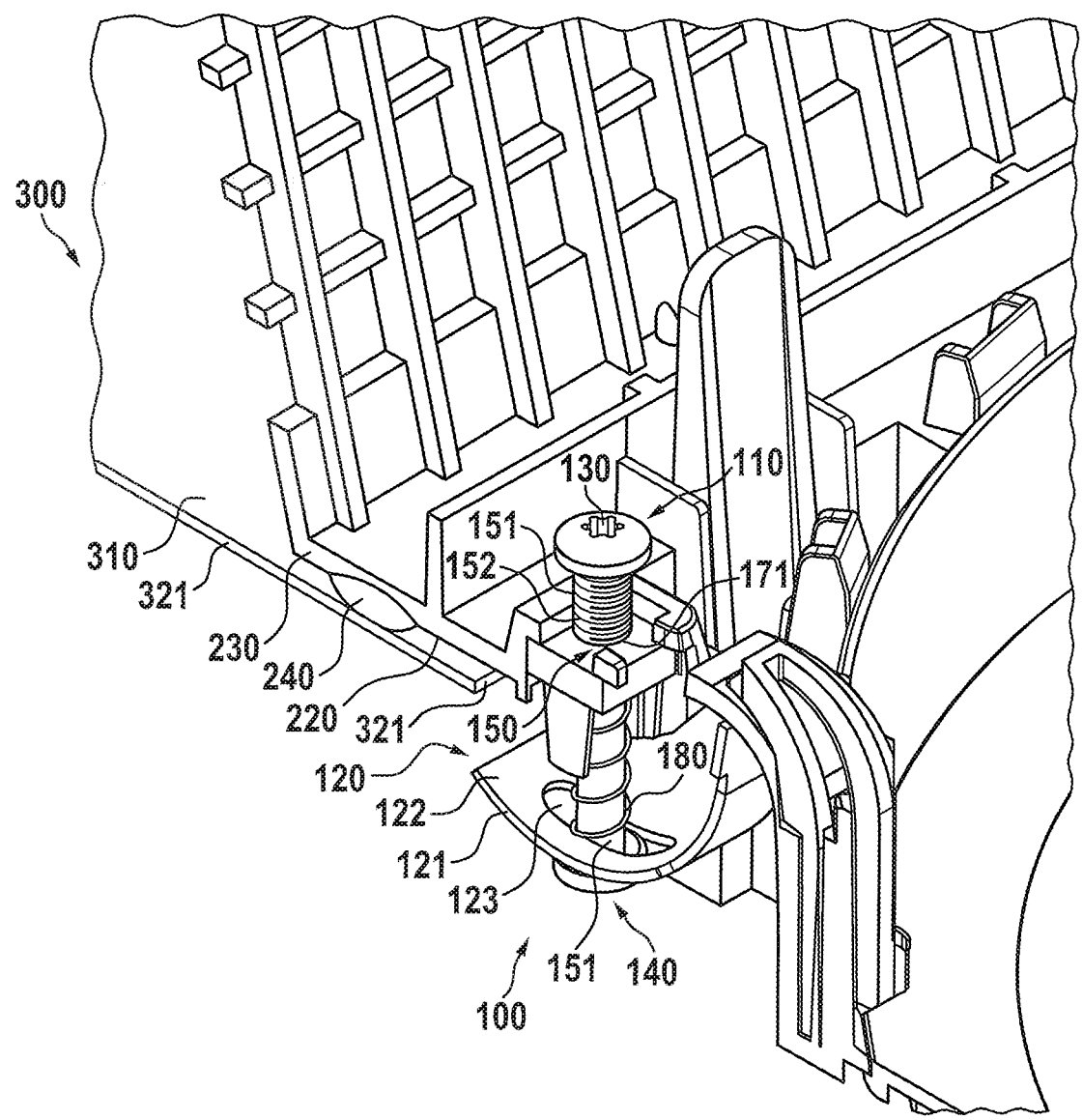
FIG. 4 shows a further embodiment of the securing system according to the invention.

FIG. 4 shows a further embodiment of the inventive securing system, in which the threaded sleeve 170, instead of being inserted from above into a plastic tray, is formed as a sort of cage nut, which may be laterally inserted into a corresponding recess. The threaded sleeve has thus preferably a rectangular shape and has a threaded cavity.

The characteristics of the invention, which have been disclosed in this description, in the drawings and in the claims, may be essential for practicing the invention, either individually or in any combination thereof.

REFERENCE LIST 100 securing system
110 pretensioning device
120 securing clamp
121 fixed end
122 movable end
123 slot
130 first drive
140 second drive
150 first bolt
151 bolt shaft
152 outer thread
160 second bolt
161 bolt head
170 threaded sleeve
171 inner thread
180 spring
181 spring recess
200 roof structure
210 outer side
220 inner side
230 flange, surrounding
240 sealing element
300 switch cabinet
310 roof
320 notch
321 wall of notch

The invention claimed is:

1. A securing system for securing a roof structure in a notch on a roof of a switch cabinet, wherein the securing system comprises a pretensioning device connected to the roof structure as well as a securing clamp, wherein the securing clamp comprises a fixed end, through which the securing clamp is fixed to an inner side of the roof structure, and an end that moves with respect to the fixed end, on which the pretensioning device engages, so that a radius of curvature of the securing clamp can be set via the pretensioning device, wherein in a first position of the pretensioning device, the securing clamp is configured to engage underneath an edge of the notch, thereby fixing the roof structure on the switch cabinet, and in a second position of the pretensioning device, the securing clamp is configured to release the notch, wherein the pretensioning device extends from an outer side of the roof structure through the roof structure up to an inner side of the roof structure and has a first drive for a tool on the outer side, wherein the pretensioning device has a second drive for a tool on the inner side.

2. The securing system of claim 1, wherein the pretensioning device has a first bolt having the first drive for a tool and a second bolt having the second drive for a tool, wherein both bolts are non-rotatably connected to each other.

3. The securing system of claim 2, wherein one of the bolts has a bolt shaft having an outer thread, with which the bolt extends through a threaded sleeve having a complementary inner thread, which forms a passage between an inner side of the roof structure and an outer side of the roof structure, wherein the threaded sleeve is non-rotatably connected about its longitudinal axis to the roof structure.

4. The securing system of claim 2, wherein the second bolt is formed by a sleeve nut, having a screw head, which is provided with the second drive.

5. The securing system of claim 2, wherein the securing clamp is provided, at its movable end, with a slot, which extends along the securing clamp in the direction of the fixed end, wherein one of the bolts extends, with its bolt shaft, through the slot and supports the securing clamp with an edge region of slot on a bolt head of second bolt, so that the bolt shaft is guided along the slot, when the pretensioning device is moved between the first and second position.

6. The securing system of claim 1, wherein the securing clamp is fixed with its fixed end on an inner side of roof structure, vertically above the notch and at a distance from an edge of the notch on the inner side of the roof structure, then extends through notch and approaches the edge of notch.

7. The securing system of claim 1, wherein the pretensioning device is biased by a spring element in the second position.

8. The securing system of claim 1, wherein the securing clamp is made of an elastic spring material, and wherein the securing clamp is biased in the direction of the second position.

9. The securing system of claim 8, wherein the securing clamp is made of a spring steel.

10. The securing system of claim 1, wherein the roof structure has a surrounding flange, through which the roof structure is applied onto an edge of the notch of the switch cabinet roof, wherein, in an overlapping region between the surrounding flange and the edge a sealing element is disposed, the compression of which may be variably set by means of the pretensioning device.

11. The securing system of claim 1, wherein the roof structure is of a cooling device.

* * * * *